United States Patent
Poole et al.

(10) Patent No.: US 9,624,414 B2
(45) Date of Patent: Apr. 18, 2017

(54) REFRIGERANT

(71) Applicant: RPL Holdings Limited, Hale, Altrincham, Cheshire (GB)

(72) Inventors: John Edward Poole, Altrincham (GB); Richard Powell, Huntington (GB)

(73) Assignee: RPL Holdings Limited, Altrincham (GB)

( * ) Notice: Subject to any disclaimer, the term of this patent is extended or adjusted under 35 U.S.C. 154(b) by 0 days.

(21) Appl. No.: 15/029,232

(22) PCT Filed: Oct. 9, 2014

(86) PCT No.: PCT/GB2014/053036
§ 371 (c)(1),
(2) Date: Apr. 13, 2016

(87) PCT Pub. No.: WO2015/055984
PCT Pub. Date: Apr. 23, 2015

(65) Prior Publication Data
US 2016/0251556 A1    Sep. 1, 2016

(30) Foreign Application Priority Data

| Oct. 15, 2013 | (GB) | 1318244.9 |
| Apr. 4, 2014 | (GB) | 1406171.7 |
| Apr. 22, 2014 | (GB) | 1407099.9 |
| Jun. 11, 2014 | (GB) | 1410411.1 |
| Sep. 26, 2014 | (GB) | 1417072.4 |

(51) Int. Cl.
*C09K 5/04* (2006.01)

(52) U.S. Cl.
CPC .......... *C09K 5/045* (2013.01); *C09K 2205/12* (2013.01); *C09K 2205/122* (2013.01); *C09K 2205/22* (2013.01); *C09K 2205/43* (2013.01)

(58) Field of Classification Search
CPC .............. C09K 5/045; C09K 2205/122; C09K 2205/43; C09K 2205/12
USPC .......................................................... 252/67
See application file for complete search history.

(56) References Cited

U.S. PATENT DOCUMENTS

| 6,508,950 B1 * | 1/2003 | Lim | C09K 5/045 |
| | | | 252/67 |
| 9,023,231 B2 * | 5/2015 | Poole | C09K 5/045 |
| | | | 252/67 |
| 2004/0016902 A1 * | 1/2004 | Lee | C09K 5/045 |
| | | | 252/67 |
| 2012/0312048 A1 * | 12/2012 | Poole | C09K 5/045 |
| | | | 62/304 |
| 2016/0272862 A1 * | 9/2016 | Capuciati | C09K 5/045 |

FOREIGN PATENT DOCUMENTS

| WO | 2011/077088 | 6/2011 |
| WO | 2014/076475 | 5/2014 |

OTHER PUBLICATIONS

WO patent application No. PCT/GB2014/053036, International Search Report mailed Jan. 16, 2015.

* cited by examiner

*Primary Examiner* — Douglas McGinty
(74) *Attorney, Agent, or Firm* — Weaver Austin Villeneuve & Sampson LLP

(57) ABSTRACT

A refrigerant composition consisting essentially of R227ea 3-9% R134a 25-70% R125 3-35% R32 10-35% together with an optional hydrocarbon component; wherein the amounts are by weight and are selected to total 100%.

9 Claims, No Drawings

REFRIGERANT

This invention relates to a hydrofluorocarbon (HFC) refrigerant mixture for use in a thermal pump.

This invention also relates to thermal pumps containing the multi-component fluid refrigerants particularly but not exclusively for air conditioning and other thermal pumping systems.

In this specification the term 'thermal pump' is used generically to describe any powered device which moves heat from a source to a sink against a thermal gradient by the input of mechanical work and involving the cyclical condensation and evaporation of a volatile refrigerant. An air conditioner or a refrigerator is a particular type of thermal pump where the lower temperature is required for the intended application, that is cooling an enclosed space. Conversely, a heat pump is a particular type of thermal pump where the higher temperature is required for the intended application, that is heating an enclosed space. The distinction between an air conditioning unit or refrigerator and a heat pump is merely one of intended purpose, not operating principle. Indeed, many so-called "air conditioning" systems are designed to supply either heating or cooling depending upon the user's need at a specific time. In this specification the term "air conditioning" will be applied to systems that are intended only for cooling. A thermal pump that can provide heat or cooling depending upon the operational mode selected is referred to as a "reversible thermal pump" in this specification. A thermal pump generally comprises a closed circuit including an evaporator, condenser and a pump.

All thermal pump devices may be driven by an external energy source that may potentially contribute to global warming by releasing $CO_2$ into the atmosphere through the combustion of fossil fuel. This is sometimes called 'indirect' global warming to distinguish it from 'direct' global warming caused by the release of refrigerants with high global warming potentials such as hydrofluorocarbons (HFCs). The sum of the direct and indirect contributions to global warming resulting from the operation of a thermal pump is known as its "Total Equivalent Thermal Impact" or "TEWI". For most thermal pumps the indirect contribution significantly exceeds the direct effect, for example by a factor of at least five. The total global warming caused by a thermal pump can be reduced by making the device more energy efficient or by replacing the HFCs with refrigerants having lower global warming potentials. Preferably, a combination of both approaches may be used.

It is well known that chlorofluorocarbons (CFCs) such as R12 ($CF_2Cl_2$) and R502 and hydrochlorofluorocarbons (HCFCs) such as R22 migrate to the stratosphere where they are broken down by ultra-violet light to attack the ozone layer. These Ozone Depleting Substances (ODS) are in the process of being replaced by non ozone depleting alternatives such as HFCs, HFOs and hydrocarbons.

The main non ozone depleting replacements for R502 are HFC compositions with refrigerant numbers R404A and R507 which, while being excellent refrigerants in terms of energy efficiency, non flammability, low toxicity and thermodynamic properties, nevertheless have GWPs which are at the high end of the range of commonly used HFCs. R404A and R507 have GWPs of 3,922 and 3,985 respectively according to the Fourth Assessment Report of the Intergovernmental Panel on Climate Change.

A problem with use of HFC's as refrigerants has been their poor compatibility with lubricants used to ensure smooth running of the pump which is used to drive the HFC's around the system. Many existing systems have been designed for use with CFCs and HCFCs such as R12 or R22 or older CFC HCFC mixtures such as R502. These refrigerants are compatible with mineral oil or alkylbenzene lubricants. However the HFC mixtures used to replace CFC's are less miscible with mineral oil or other hydrocarbon lubricants so that use of a hydrocarbon component has been necessary. Hydrocarbons are problematic due to their inherent flammability and their propensity to form flammable mixtures. The requirements for approval by ASHRAE category 1 include the requirement for non-flammability under worst case formulation fractionation conditions. Lower boiling point hydrocarbons such as propane or isobutane vaporise during initial stages of a leak whereas higher boiling point hydrocarbons such as pentane tend to remain in the container to form a flammable residue. Azeotropic mixtures can be formed and hydrocarbons and HFA's with similar boiling points tend to co-distil. Furthermore the requirements imposed on a hydrocarbon component vary due to the working temperature of a refrigerant blend required for different uses. Supermarket freezers may operate at −35° C., domestic freezers at −18° C. to −25° C., domestic refrigerators at −3° C. to 6° C. and air conditioning systems at 0° C. to 20° C. Therefore much attention has been paid to maximising the amount of hydrocarbon without creating a flammability hazard.

A particular problem arises with replacement of a refrigerant mixture in existing equipment, in contrast to a refrigerant used in new equipment, since it is impractical to entirely replace the lubricant. Therefore a new drop-in refrigerant must be compatible with the existing lubricant, particularly mineral oil or alkylbenzene. However, the refrigerant should be capable of use with equipment containing polyesters or other commonly employed lubricants.

According to the present invention there is provided a refrigerant composition consisting essentially of a hydrofluorocarbon component consisting of

| | |
|---|---|
| R227ea | 3-9% |
| R134a | 25-70% |
| R125 | 3-35% |
| R32 | 10-35% | together with an optional hydrocarbon component;
wherein the amounts are by weight and are selected to total 100%.

The refrigerants of the present invention may be used as a replacement for R22 in existing equipment. Preferred compositions have particularly advantageous properties. The pressure is not significantly greater than the pressure of R22 and is advantageously lower than the pressure for R407C which is commonly used as an R22 replacement. The refrigerants are non-flammable and have a global warming potential less than 2200.

Compressor discharge temperatures are lower than for R22. However discharge temperatures are advantageous because decomposition of the lubricating oil is reduced, resulting in less formation of decomposition products at the discharge outlet during prolonged use.

The refrigerants may be used for air conditioning, refrigeration and general heat pump applications. The glide may be relatively high, for example within the range 3.9 to 4.7° C. The relatively high glide gives higher energy efficiencies and capacities. Flow rates per kilowatt are comparable to R22. This allows the refrigerants to be used as a retrofit for existing R22 equipment. Refrigerants of the present invention have the further advantage that they may be formulated using readily commercially available ingredients. The coefficient of performance is comparable to R22. Importantly the GWP is low while maintaining non-flammability particularly at the end of a leak when more volatile compounds have been lost from the mixture. It is important that flammable components are lost gradually from a mixture during a leak so that neither the escaping vapour nor the residual liquid are flammable.

When a hydrocarbon component is used this is compatible with hydrocarbon lubricants, e.g. mineral oil, alkyl benzenes or polyolefin lubricants, and also with oxygen containing lubricants, particularly polyesters and polyethers.

A preferred amount of R227ea is in the range 3% to 8%.

A preferred amount of R134a is 42.5% to 70%, more preferably 42.5% to 65%.

A preferred amount of R125 is 3% to 20%.

A preferred amount of R32 is 10% to 20%.

An alternative preferred composition has a hydrofluorocarbon component consisting of:

| | |
|---|---|
| R227ea | 3-9% |
| R134a | 25-70% |
| R125 | 12-35% |
| R32 | 10-35% |

In this specification where the blends are defined by the percentages of HFC components the blends may also include an optional hydrocarbon component wherein the amounts are by weight and are the HFC and HC amounts together are selected to total 100%.

A further preferred composition has a hydrofluorocarbon component consisting of:

| | |
|---|---|
| R227ea | 3-6% |
| R134a | 42.5-65% |
| R125 | 15-30% |
| R32 | 10-20% |

An alternative refrigerant composition consists essentially of

| | |
|---|---|
| R227ea | 3-9% |
| R134a | 25-70% |
| R125 | 3-35% |
| R32 | 10-35% | together with an optional hydrocarbon component;
wherein the amounts are by weight and are selected to total 100%.

Specific examples of preferred compositions are as follows:—

| Percentage Amount | | | | | |
|---|---|---|---|---|---|
| R227ea | 5 | 3 | 5 | 5 | 2 |
| R134a | 70 | 67 | 59 | 60 | 69 |
| R125 | | 5 | 10 | 10 | 3 |
| R32 | 25 | 25 | 26 | 25 | 26 |

The hydrocarbon component may consist of: 0.6% to 5%, preferably 1 to 5% by weight of a hydrocarbon selected from the group consisting of: propane, 2-methyl propane, butane, pentane, 2-methylbutane and mixtures thereof.

Preferred hydrocarbons are selected from: butane, 2-methylpropane and 2-methylbutane and mixtures thereof.

Especially preferred are mixtures of butane and 2-methylbutane. An amount of 0.6% butane and 0.6% 2-methylbutane so that the total hydrocarbon is 1.2% is employed to achieve satisfactory oil return.

Preferably the hydrocarbon component may consist of from 1% to 6% of hydrocarbons selected from the group consisting of: propene, propane, 2-methylpropane, n-butane, but-1-ene, but-2-ene, 2-methylpropene, n-pentane, and 2-methylbutane, or mixtures thereof, to assist oil return. Blends containing two or more hydrocarbons are preferred if the compressors are lubricated by hydrocarbon oils.

A particularly preferred hydrocarbon component consists of a mixture of butane and 2-methylbutane wherein each is present in an amount equal to or greater than 0.6% by weight.

Certain preferred compositions contain 0.6-1.9%, preferably 0.6% n-butane and 0.3-0.6%, preferably 0.6% 2-methylbutane.

A particularly preferred composition consists of:

| | % |
|---|---|
| R227ea | 4-6 |
| R134a | 50-55 |
| R125 | 17-22 |
| R32 | 17-22 |
| n-butane | 0.6-2 |
| 2-methylbutane | 0.6-2 |

An especially preferred composition consists of:

| | % |
|---|---|
| R227ea | 5 |
| R134a | 53.8 |
| R125 | 20 |
| R32 | 20 |
| n-butane | 0.6 |
| 2-methylbutane | 0.6 |

Another preferred composition consists of:

| | % |
|---|---|
| R227ea | 5 |
| R134a | 54.4 |
| R125 | 20 |
| R32 | 20 |
| 2-methylbutane | 0.6 |

Preferred specific compositions consist of the following mixtures:

| | |
|---|---|
| 1) R134a | 31% |
| R32 | 31% |
| R125 | 31% |
| R227ea | 5% |
| hydrocarbon component | 2% |
| 2) R134a | 34.5% |
| R32 | 30% |
| R125 | 30% |
| R227ea | 4% |
| hydrocarbon component | 1.5% |
| 3) R134a | 25% |
| R32 | 32% |
| R125 | 32.5% |

| | | |
|---|---|---|
| | R227ea | 9% |
| | hydrocarbon component | 1.5% |
| 4) | R134a | 30.5% |
| | R32 | 31% |
| | R125 | 31% |
| | R227ea | 5% |
| | hydrocarbon component | 2.5% |
| 5) | R134a | 37% |
| | R32 | 28% |
| | R125 | 30.5% |
| | R227ea | 3% |
| | hydrocarbon component | 1.5% |
| 6) | R134a | 58.5% |
| | R32 | 16% |
| | R125 | 19% |
| | R227ea | 5% |
| | n-butane | 1.5% |
| 7) | R134a | 60% |
| | R32 | 16% |
| | R125 | 19% |
| | R227ea | 5% |
| 8) | R134a | 53.5% |
| | R32 | 20% |
| | R125 | 20% |
| | R227ea | 5% |
| | n-butane | 1.5% |
| 9) | R134a | 55% |
| | R32 | 20% |
| | R125 | 20% |
| | R227ea | 5% |
| 10) | R134a | 53.5% |
| | R32 | 20% |
| | R125 | 20% |
| | R227ea | 5% |
| | n-butane | 1.5% |
| 11) | R134a | 63.5% |
| | R32 | 15% |
| | R125 | 15% |
| | R227ea | 5% |
| | n-butane | 1.5% |
| 12) | R134a | 58.5% |
| | R32 | 15% |
| | R125 | 20% |
| | R227ea | 5% |
| | n-butane | 1.5% |
| 13) | R134a | 65% |
| | R32 | 15% |
| | R125 | 15% |
| | R227ea | 5% |
| 14) | R134a | 55% |
| | R32 | 20% |
| | R125 | 20% |
| | R227ea | 5% |
| 15) | R134a | 53.5% |
| | R32 | 25% |
| | R125 | 15% |
| | R227ea | 0.5% |
| | n-butane | 0.9% |
| | 2-methylbutane | 0.6% |
| 16) | R134a | 70% |
| | R32 | 25% |
| | R125 | 15% |
| | R227ea | 0.5% |
| 17) | R134a | 67% |
| | R32 | 25% |
| | R125 | 0.5% |
| | R227ea | 0.3% |
| 18) | R134a | 59% |
| | R32 | 26% |
| | R125 | 10% |
| | R227ea | 0.5% |
| 19) | R134a | 60% |
| | R32 | 25% |
| | R125 | 10% |
| | R227ea | 0.5% |
| 20) | R134a | 69% |
| | R32 | 26% |
| | R125 | 3% |
| | R227ea | 0.2% |

In preferred embodiments refrigerant compositions of this invention may consist of the stated ingredients in the sense that no further compounds are present in functional amounts, excluding possible traces of impurities.

Preferably the flammability of the blends of this invention are rated A2 according to the ASHRAE Committee 34 classification, i.e. low toxicity and mildly flammable. More preferably the blends are rated A1, i.e. low toxicity and non-flammable.

In this specification an energy efficiency of a thermal pump is expressed as its "Coefficient of Performance" (COP), which is defined as the ratio of the cooling produced divided by the energy input to the electrical motor driving the compressor.

Percentages and other amounts referred to in the specification are by weight unless indicated otherwise and are selected from any ranges quoted to total 100%.

The invention is further described by means of example, but not in any limitative sense.

Blends containing the following ingredients were prepared.

TABLE 2

| Blend | 24 | 25 | 26 | 27 | 28 | 29 | 30 | 36 |
|---|---|---|---|---|---|---|---|---|
| R134a | 55 | 53.5 | 52 | 55 | 57 | 54 | 54 | 53.8 |
| R32 | 20 | 20 | 20 | 20 | 18 | 20 | 20 | 20 |
| R125 | 20 | 20 | 21 | 20 | 19 | 21 | 20 | 20 |
| R227ea | 5 | 5 | 6 | 4 | 6 | 3.6 | 5 | 5 |
| n-butane | | 1.5 | | | | 0.6 | | 0.6 |
| R600a | | | 1 | 1 | | 0.8 | 1 | — |
| 2-methylbutane | | | | | | | | 0.6 |
| R290 | | | | | | | | — |
| GWP | 100 | 100 | 100 | 100 | 100 | 100 | 100 | 100 |

TABLE 3

| Blend | 31 | 32 | 25 | 24 | 33 | | 34 | | 35 | |
|---|---|---|---|---|---|---|---|---|---|---|
| R134a | 58.5 | 60 | 53.5 | 55 | 42.5 | 47.5 | 47.5 | 52.5 | 37.5 | 42.5 |
| R32 | 16 | 16 | 20 | 20 | 15 | 15 | 10 | 10 | 20 | 20 |
| R125 | 19 | 19 | 20 | 20 | 35 | 35 | 35 | 35 | 35 | 35 |
| R227ea | 5 | 5 | 5 | 5 | 5 | 0 | 5 | 0 | 5 | 0 |
| n-butane | 1.5 | 1.5 | 1.5 | | 1.9 | 1.9 | 1.9 | 1.9 | 1.9 | 1.9 |
| 2-methylbutane | | | | | 0.6 | 0.6 | 0.6 | 0.6 | 0.6 | 0.6 |
| GWP | 1771 | 1792 | 1761 | 1783 | 2095 | | 2133 | | 2057 | |

EXAMPLE 1

Table 4 provides comparative cycle data for commercially available refrigerants being used in a typical air conditioning system. Such a system comprises a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a room; the resulting lower pressure, lower temperature then returns to the compressor to complete the cycle. The components are connected by appropriate pressure tubing and controlled by circuitry including a temperature sensor which enables the a/c system to maintain the room at desired level.

The operating conditions for the a/c system are the following.
System cooling capacity (kW)=1.00
Compressor isentropic efficiency=0.800
Compressor volumetric efficiency=0.900
Electric motor efficiency=0.900
Evaporator: average sat. temp. (C)=7.0 Suction gas superheat (K)=5.0
Condenser: average sat. temp. (C)=45.0 Liquid subcooling (K)=5.0

Also included are the global warming potentials (GWPs) derived from the AR4 values of their component refrigerants.

TABLE 4

| Performance Property | Units | R22 | R434A | R424A | R407C | R427A | R438A |
|---|---|---|---|---|---|---|---|
| Discharge pressure | bar | 17.29 | 19.45 | 16.14 | 18.63 | 17.96 | 17.84 |
| Discharge temp | °C. | 78.8 | 59.7 | 61.2 | 72.3 | 69.2 | 65.1 |
| Capacity | kJ/m$^3$ | 3637 | 3570 | 3100 | 3727 | 3557 | 3456 |
| % of R22 | | | 98 | 85 | 102 | 98 | 95 |
| COP | | 4.35 | 4.02 | 4.19 | 4.25 | 4.24 | 4.20 |
| Compression ratio | | 2.78 | 2.79 | 2.94 | 2.95 | 2.94 | 2.93 |
| Glide (evaporator) | K | 0.0 | 1.4 | 3.0 | 4.6 | 4.2 | 3.7 |
| Flow rate | kg/s × 10$^3$ | 6.18 | 9.10 | 8.12 | 6.15 | 6.57 | 7.41 |
| GWP | | 1810 | 3245 | 2440 | 1774 | 2138 | 2264 |

EXAMPLE 2

Table 5 provides comparative cycle data for commercially available refrigerants being used in a typical refrigeration system. Such a system comprises a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a refrigerated space; the resulting lower pressure, lower temperature then returns to the compressor to complete the cycle. The components are connected by appropriate pressure tubing and controlled by circuitry including a temperature sensor which enables the a/c system to maintain the refrigerator at desired level.

The operating conditions for the refrigeration system are the following.
System cooling capacity (kW)=1.00
Compressor isentropic efficiency=0.800
Compressor volumetric efficiency=0.900
Electric motor efficiency=0.900
Evaporator: average sat. temp. (° C.)=−35.0 Superheat (K)=5.0
Condenser: average sat. temp. (° C.)=35.0 Subcooling (K)=5.0

Also included are the global warming potentials (GWPs) derived from the TAR values of their component refrigerants.

TABLE 5

| Performance Property | | R22 | R502 | RS-45 | Isceon™ 29 R422D | Isceon™ 79 R422A | RS-52 R428A |
|---|---|---|---|---|---|---|---|
| Discharge pressure | bara | 13.55 | 14.76 | 15.31 | 14.14 | 16.22 | 17.24 |
| Discharge temperature | °C. | 116.9 | 74.7 | 65.9 | 66.9 | 61.7 | 68.2 |
| Capacity | kJ/m$^3$ | 777 | 791 | 713 | 640 | 733 | 802 |
| % of R22 | | | 102 | 92 | 82 | 94 | 103 |
| % of R502 | | | 100 | 90 | 81 | 93 | 101 |
| COP | | 1.73 | 1.64 | 1.55 | 1.56 | 1.5 | 1.5 |
| Compression ratio | | 10.26 | 9.3 | 10.34 | 11.12 | 10.13 | 9.57 |
| Glide (evaporator) | K | 0.0 | 0.1 | 1.5 | 2.9 | 1.5 | 0.2 |
| Flow rate | kg/s × 10$^3$ | 6.37 | 10.01 | 9.89 | 9.73 | 11.21 | 11.02 |
| GWP | | 1810 | 4657 | 3245 | 2729 | 3143 | 3607 |

| Performance Property | | HP62 R404A | AZ-50 R507 | Isceon™ 99 R438A | Klea™ 66 R407C | FX100 R427A | R407A |
|---|---|---|---|---|---|---|---|
| Discharge pressure | | 16.12 | 16.55 | 13.87 | 14.46 | 13.96 | 15.33 |
| Discharge temperature | | 68.2 | 66.7 | 78.8 | 96.3 | 88.9 | 90.7 |
| Capacity | | 785 | 804 | 653 | 713 | 677 | 750 |

TABLE 5-continued

| | | | | | | |
|---|---|---|---|---|---|---|
| % of R22 | 101 | 103 | 84 | 92 | 87 | 97 |
| % of R502 | 99 | 102 | 83 | 90 | 86 | 95 |
| COP | 1.56 | 1.55 | 1.63 | 1.67 | 1.66 | 1.65 |
| Compression ratio | 9.75 | 9.58 | 11.70 | 11.87 | 11.80 | 11.52 |
| Glide (evaporator) | 0.5 | 0.0 | 3.6 | 4.4 | 4.10 | 4.2 |
| Flow rate | 9.33 | 9.67 | 7.93 | 6.43 | 6.92 | 7.02 |
| GWP | 3992 | 3985 | 2264 | 1774 | 2138 | 2107 |

EXAMPLE 3

A typical refrigeration system was modelled using the refrigerant blends prepared in accordance with this specification under the same operating conditions as for the refrigerants in Example 3. The performance data obtained are shown in Table 6.

TABLE 6

| Performance Property | Blend 1 | Blend 13 | Blend 9 |
|---|---|---|---|
| Discharge pressure | 16.15 | 12.79 | 14.92 |
| Discharge temp | 100.4 | 102.6 | 96.2 |
| Capacity | 816 | 632 | 744 |

TABLE 6-continued

| Performance Property | Blend 1 | Blend 13 | Blend 9 |
|---|---|---|---|
| % of R22 | 105 | 81 | 96 |
| % of R502 | 103 | 80 | 94 |
| COP | 1.66 | 1.71 | 1.67 |
| Compression ratio | 11.30 | 12.45 | 11.59 |
| Glide (evaporator) | 4.6 | 4.4 | 4.5 |
| Flow rate | 6.27 | 5.76 | 6.3 |
| GWP | 1888 | 1284 | 1770 |

EXAMPLE 4

Table 7 provides comparative cycle data for two commercially available refrigerants, R407C and R22, being used in a typical air conditioning system, plus the cycle data for blends 24 to 30 formulated in accordance with this specification. Such a system comprises a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a room; the resulting lower pressure, lower temperature then returns to the compressor to complete the cycle. The components are connected by appropriate pressure tubing and controlled by circuitry including a temperature sensor which enables the a/c system to maintain the room at desired level.

The operating conditions for the a/c system are the following.

System cooling capacity (kW)=1.00
Compressor isentropic efficiency=0.800
Compressor volumetric efficiency=0.900
Electric motor efficiency=0.900
Evaporator: average sat. temp. (C)=7.0 Suction gas superheat (K)=5.0
Condenser: average sat. temp. (C)=45.0 Liquid subcooling (K)=5.0

Also included are the global warming potentials (GWPs) derived from the AR4 values of their component refrigerants.

TABLE 7

| Performance Property | | 24 | 25 | 26 | 27 | 28 | 29 | 30 | R22 | R407C |
|---|---|---|---|---|---|---|---|---|---|---|
| Discharge pressure | bara | 17.53 | 17.66 | 17.81 | 17.62 | 17.02 | 17.8 | 17.71 | 17.29 | 18.63 |
| Discharge Temperature | ° C. | 70.9 | 70.5 | 70.5 | 70.8 | 70.2 | 71.1 | 70.7 | 78.8 | 72.3 |
| Capacity | kJ/m$^3$ | 3516 | 3532 | 3554 | 3529 | 3416 | 3565 | 3539 | 3637 | 3727 |
| COP | | 4.28 | 4.27 | 4.25 | 4.27 | 4.28 | 4.27 | 4.26 | 4.35 | 4.25 |
| Compression Ratio | | 2.98 | 2.97 | 2.96 | 2.97 | 2.99 | 2.96 | 2.97 | 2.78 | 2.95 |
| Glide (evaporator) | K | 4.7 | 4.7 | 4.8 | 4.7 | 4.6 | 4.6 | 4.8 | 0 | 4.6 |
| Flow rate | kg/s × 10$^3$ | 6.28 | 6.27 | 6.35 | 6.25 | 6.36 | 6.17 | 6.29 | 6.18 | 6.17 |
| GWP | | | | | | | | | | |

EXAMPLE 5

Table 8 provides comparative cycle data for commercially available refrigerants being used in a typical refrigeration system, plus blends 24 to 30 formulated in accordance with this specification. Such a system comprises a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a refrigerated space; the resulting lower pressure, lower temperature then returns to the compressor to complete the cycle. The components are connected by appropriate pressure tubing and controlled by circuitry including a temperature sensor which enables the a/c system to maintain the refrigerator at desired level.

The operating conditions for the refrigeration system are the following.

System cooling capacity (kW)=1.00
Compressor isentropic efficiency=0.800
Compressor volumetric efficiency=0.900
Electric motor efficiency=0.900
Evaporator: average sat. temp. (° C.)=−35.0 Superheat (K)=5.0
Condenser: average sat. temp. (° C.)=35.0 Subcooling (K)=5.0

Also included are the global warming potentials (GWPs) derived from the AR4 values of their component refrigerants.

TABLE 8

| Performance Property | | 24 | 25 | 26 | 27 | 28 | 29 | 30 | R22 | R404A | R407C |
|---|---|---|---|---|---|---|---|---|---|---|---|
| Discharge pressure | bara | 13.6 | 13.71 | 13.83 | 13.74 | 13.19 | 13.81 | 13.74 | 13.55 | 16.12 | 14.46 |
| Discharge temperature | ° C. | 93 | 91.1 | 91.8 | 92.7 | 91.1 | 93.6 | 92.3 | 116.9 | 68.2 | 96.3 |
| Capacity | kJ/m$^3$ | 660 | 667 | 671 | 668 | 636 | 674 | 668 | 778 | 785 | 713 |
| COP | | 1.68 | 1.68 | 1.67 | 1.67 | 1.68 | 1.68 | 1.67 | 1.73 | 1.56 | 1.67 |
| Compression ratio | | 12.1 | 12.0 | 12.0 | 12.0 | 12.3 | 12.0 | 12.0 | 10.3 | 9.8 | 11.9 |
| Glide (evaporator) | K | 4.3 | 4.3 | 4.5 | 4.4 | 4.2 | 4.3 | 4.5 | 0 | 0.5 | 4.4 |
| Flow rate | kg/s × 10$^3$ | 6.61 | 6.6 | 6.68 | 6.59 | 6.72 | 6.45 | 6.62 | 6.37 | 9.33 | 6.42 |
| GWP | | | | | | | | | | | |

EXAMPLE 6

Table 9 provides comparative cycle data for two commercially available refrigerants, R407C and R22, being used in a typical air conditioning system, plus the cycle data for blends 31 to 35 formulated in accordance with this specification. Such a system comprises a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a room; the resulting lower pressure, lower temperature then returns to the compressor to complete the cycle. The components are connected by appropriate pressure tubing and controlled by circuitry including a temperature sensor which enables the a/c system to maintain the room at desired level.

The operating conditions for the a/c system are the following.
System cooling capacity (kW)=1.00
Compressor isentropic efficiency=0.800
Compressor volumetric efficiency=0.900
Electric motor efficiency=0.900
Evaporator: average sat. temp. (C)=7.0 Suction gas superheat (K)=5.0
Condenser: average sat. temp. (C)=45.0 Liquid subcooling (K)=5.0

Also included are the global warming potentials (GWPs) derived from the AR4 values of their component refrigerants.

EXAMPLE 7

Table 10 provides comparative cycle data for commercially available refrigerants being used in a typical refrigeration system, plus blends 24 to 30 formulated in accordance with this specification. Such a system comprises a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a refrigerated space; the resulting lower pressure, lower temperature then returns to the compressor to complete the cycle. The components are connected by appropriate pressure tubing and controlled by circuitry including a temperature sensor which enables the a/c system to maintain the refrigerator at desired level.

The operating conditions for the refrigeration system are the following.
System cooling capacity (kW)=1.00
Compressor isentropic efficiency=0.800
Compressor volumetric efficiency=0.900
Electric motor efficiency=0.900
Evaporator: average sat. temp. (° C.)=−35.0 Superheat (K)=5.0
Condenser: average sat. temp. (° C.)=35.0 Subcooling (K)=5.0

Also included are the global warming potentials (GWPs) derived from the AR4 values of their component refrigerants.

TABLE 9

| Performance Property | | 31 | 32 | 33 | 34 | 35 | R22 | R407C |
|---|---|---|---|---|---|---|---|---|
| Discharge pressure | bara | 16.73 | 16.61 | 18.07 | 16.96 | 19.16 | 17.29 | 18.63 |
| Discharge Temperature | ° C. | 69.1 | 69.5 | 68.2 | 66.3 | 69.8 | 78.8 | 72.3 |
| Capacity | kJ/m$^3$ | 3351 | 3334 | 3561 | 3339 | 3637 | 3727 | 3727 |
| COP | | 4.28 | 4.29 | 4.23 | 4.24 | 4.35 | 4.35 | 4.25 |
| Compression ratio | | 2.99 | 3 | 2.94 | 2.96 | 2.92 | 2.78 | 2.95 |
| Glide (evaporator) | K | 4.4 | 4.5 | 4.3 | 4 | 4.4 | 0 | 4.6 |
| Flow rate | kg/s × 10$^3$ | 6.4 | 6.41 | 6.42 | 6.96 | 6.18 | 6.18 | 6.17 |
| GWP | | 1771 | 1792 | 2095 | 2133 | 2057 | | 1774 |

TABLE 10

| Performance Property | | 31 | 32 | 33 | 34 | 35 | R22 | R404A | R407C |
|---|---|---|---|---|---|---|---|---|---|
| Discharge pressure | bara | 12.97 | 12.86 | 14.04 | 13.16 | 14.91 | 13.55 | 16.12 | 14.46 |
| Discharge temp | °C. | 88.7 | 89.7 | 86 | 81.8 | 89.9 | 116.9 | 68.2 | 96.3 |
| Capacity | kJ/m$^3$ | 623 | 616 | 677 | 623 | 731 | 778 | 785 | 713 |
| COP | | 1.68 | 1.68 | 1.66 | 1.66 | 1.66 | 1.73 | 1.56 | 1.67 |
| Compression ratio | | 12.2 | 12.4 | 11.8 | 12.1 | 11.53 | 10.3 | 9.8 | 11.9 |
| Glide (evaporator) | K | 4 | 3.9 | 4 | 3.7 | 4.2 | 0 | 0.5 | 4.4 |
| Flow rate | kg/s × 10$^3$ | 6.79 | 6.79 | 7.12 | 7.43 | 6.85 | 6.37 | 9.33 | 6.42 |
| GWP | | 1771 | 1792 | 2095 | 2133 | 2057 | | | |

EXAMPLE 8

Refrigerant blend 36, having the mass composition R32 20%, R125 20%, R134a 53.8%, R227ea 5%, n-butane 0.6% and isopentane 0.6% is used in an air conditioning system comprising a gas compressor or pump, which sucks in lower pressure, lower temperature refrigerant vapour and compresses it to a higher pressure, higher temperature gas; a condenser which cools the hot gas by rejecting heat to external air thus allowing the refrigerant to condense to a liquid; an expansion device, which drops the pressure of the liquid refrigerant; an evaporator where the low temperature gas evaporates absorbing heat from a room; the resulting lower pressure, lower temperature then returns to the compressor to complete the cycle. The components are connected by appropriate pressure tubing and controlled by circuitry including a temperature sensor which enables the a/c system to maintain the room at desired level.

The operating conditions for the a/c system are the following.
System cooling capacity (kW)=1.00
Compressor isentropic efficiency=0.800
Compressor volumetric efficiency=0.900
Electric motor efficiency=0.900
Evaporator: average sat. temp. (C)=7.0 Suction gas superheat (K)=5.0
Condenser: average sat. temp. (C)=45.0 Liquid subcooling (K)=5.0

Also included are the global warming potentials (GWPs) derived from the AR4 values of their component refrigerants. The performance data obtained are shown in Table X.

TABLE X

| Performance Property | Units | Blend 36 |
|---|---|---|
| Discharge pressure | bar | 17.50 |
| Discharge temp | °C. | 70.7 |
| Capacity | kJ/m$^3$ | 3505 |
| % of R22 | | 96 |
| COP | | 4.27 |
| Compression ratio | | 2.97 |
| Glide (evaporator) | K | 4.8 |
| Flow rate | kg/s × 10$^3$ | 6.26 |
| GWP | | |

The invention claimed is:

1. A refrigerant composition consisting essentially of a hydrofluorocarbon component consisting of:

| | |
|---|---|
| R227ea | 3-6% |
| R134a | 42.5-65% |
| R125 | 15-30% |
| R32 | 10-20%; | and
an optional hydrocarbon component;
wherein the amounts are by weight and are selected to total 100%.

2. A refrigerant composition as claimed in claim 1, wherein the amount of R134a is in the range from 53.5% to 63.5%.

3. A refrigerant composition as claimed in claim 1, consisting of:

| | % |
|---|---|
| R227ea | 4-6 |
| R134a | 50-55 |
| R125 | 17-22 |
| R32 | 17-20 |
| n-butane | 0.6-2 |
| 2-methylbutane | 0.6-2. |

4. A refrigerant composition as claimed in claim 1, consisting of:

| | % |
|---|---|
| R227ea | 5 |
| R134a | 53.8 |
| R125 | 20 |
| R32 | 20 |
| n-butane | 0.6 |
| 2-methylbutane | 0.6. |

5. A refrigerant composition as claimed in claim 1, consisting of one of the following compositions:

| | % |
|---|---|
| 1) R134a | 58.5% |
| R32 | 16% |
| R125 | 19% |
| R227ea | 5% |
| n-butane | 1.5% |
| 2) R134a | 60% |
| R32 | 16% |
| R125 | 19% |
| R227ea | 5% |
| 3) R134a | 53.5% |
| R32 | 20% |
| R125 | 20% |
| R227ea | 5% |
| n-butane | 1.5% |
| 4) R134a | 55% |
| R32 | 20% |
| R125 | 20% |
| R227ea | 5% |
| 5) R134a | 53.5% |
| R32 | 20% |
| R125 | 20% |
| R227ea | 5% |
| n-butane | 1.5% |

|  | % |
|---|---|
| 6) R134a | 63.5% |
| R32 | 15% |
| R125 | 15% |
| R227ea | 5% |
| n-butane | 1.5% |
| 7) R134a | 58.5% |
| R32 | 15% |
| R125 | 25% |
| R227ea | 5% |
| n-butane | 0.9% |
| 2-methylbutane | 0.6% |
| 8) R134a | 65% |
| R32 | 15% |
| R125 | 15% |
| R227ea | 5% |
| 9) R134a | 55% |
| R32 | 20% |
| R125 | 20% |
| R227ea | 5% |
| 10) R134a | 53.5% |
| R32 | 25% |
| R125 | 15% |
| R227ea | 0.9% |
| n-butane | 0.6% |
| 11) R134a | 54.4% |
| R32 | 20% |
| R125 | 20% |
| R227ea | 5% |
| 2-methylbutane | 0.6%. |

6. A refrigerant composition as claimed in claim 1, wherein the hydrocarbon component is selected from the group consisting of propene, propane, 2-methylpropane, n-butane, but-1-ene, but-2-ene, 2-methylpropene, n-pentane, 2-methylbutane and mixtures thereof.

7. A refrigerant composition as claimed in claim 6, wherein the hydrocarbon component consists of a mixture of n-butane and 2-methylbutane each in an amount equal to or greater than 0.6%.

8. A refrigerant composition as claimed in claim 2, wherein the hydrocarbon component is selected from the group consisting of propene, propane, 2-methylpropane, n-butane, but-1-ene, but-2-ene, 2-methylpropene, n-pentane, 2-methylbutane and mixtures thereof.

9. A refrigerant composition as claimed in claim 8, wherein the hydrocarbon component consists of a mixture of n-butane and 2-methylbutane each in an amount equal to or greater than 0.6%.

* * * * *